Patented Sept. 27, 1932

1,879,767

UNITED STATES PATENT OFFICE

WALTER SCHOELLER, OF BERLIN-WESTEND, HANS JORDAN, OF BERLIN-STEGLITZ, AND KARL SCHÖLLKOPF, OF DUSSELDORF-OBERKASSEL, GERMANY, ASSIGNORS TO THE FIRM SCHERING-KAHLBAUM A. G., OF BERLIN, GERMANY

PRODUCTION OF MENTHENES

No Drawing. Application filed November 11, 1929, Serial No. 406,507, and in Germany November 15, 1928.

Our invention relates to chemical compounds and more especially to menthenes and has for its particular object to provide means for producing such menthenes.

We have found that by partially hydrogenating by catalytic action menthadienes having a double bond in the side chain or in the form of a double bonded methylene, there can be obtained menthenes having their double bond in the nucleus. In practicing this process the temperature should be kept as low as possible and preferably not above the point at which hydrogenation commences. In this manner the double bond located outside of the nucleus can readily be hydrogenated and the absorption of hydrogen will then cease after one molecule hydrogen is bound or will slow down so remarkably that the end point of the desired reaction can readily be ascertained.

In the practice of our invention we may proceed for instance as follows:

Example 1

Beta-terpinene is treated at the lowest possible temperature and under pressure in the presence of about 1 to 3% of its weight of a hydrogenation catalyst containing nickel, and which may also be precipitated on a carrier with hydrogen, until the quantity of hydrogen is bound which is required for half-hydrogenation. The reaction occurs according to the equation:

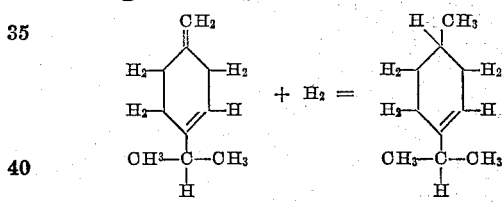

The temperature to be observed depends from the kind of catalyst used, the reaction proceeding in some cases at ordinary temperature. As a rule temperatures above 140° C. are not advisable. The temperature at which hydrogen is first bound had better not been exceeded.

We have thus obtained delta-3-p-menthene in good yield.

Example 2

Sylvestrene is treated with hydrogen as described with reference to Example 1, and there is obtained delta-1-m-methene (Liebig's Annalen, vol. 360, p. 79). The reaction occurs according to the equation:

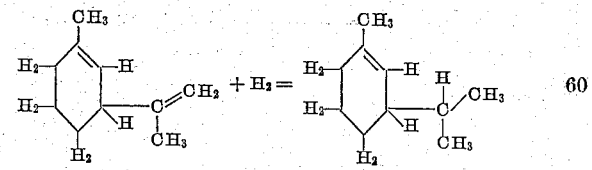

Example 3

If beta-phellandrene is treated as described with reference to Example 1, delta-2-p-menthene is obtained. The reaction occurs according to the equation:

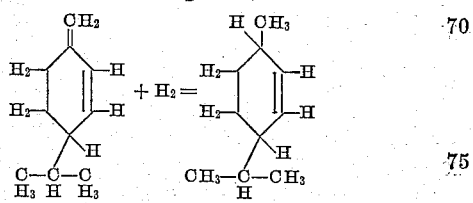

Example 4

On treating dipentene as described with reference to Example 1, carvomenthene is obtained. The reaction occurs according to the equation:

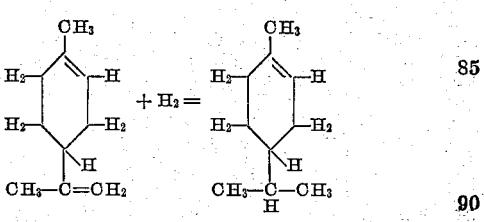

Various changes may be made in the details disclosed in the foregoing specification without departing from the invention or sacrificing the advantages thereof.

I claim:—

1. The method of producing menthenes comprising treating a liquid menthadiene having a double bond outside the nucleus at a moderately elevated temperature in the presence of a hydrogenation catalyst containing nickel with hydrogen, until one molecule of hydrogen is bound.

2. The method of producing menthenes comprising treating a liquid menthadiene having a double bond outside the nucleus at a moderately elevated temperature under pressure in the presence of a hydrogenation catalyst containing nickel with hydrogen, until one molecule of hydrogen is bound.

3. The method of producing menthenes comprising treating a liquid menthadiene having a double bond outside the nucleus in the presence of an hydrogenation catalyst containing nickel with hydrogen, until one molecule of hydrogen is bound, care being taken to avoid heating beyond the temperature at which hydrogenation begins.

In testimony whereof we affix our signatures.

WALTER SCHOELLER.
HANS JORDAN.
KARL SCHÖLLKOPF.